(12) United States Patent
Frieberg et al.

(10) Patent No.: US 12,519,131 B2
(45) Date of Patent: Jan. 6, 2026

(54) POLYMER BLEND GEL ELECTROLYTES

(71) Applicant: GM GLOBAL TECHNOLOGY OPERATIONS LLC, Detroit, MI (US)

(72) Inventors: Bradley R. Frieberg, Farmington Hills, MI (US); Zhe Li, Shanghai (CN); Yong Lu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 711 days.

(21) Appl. No.: 17/884,335

(22) Filed: Aug. 9, 2022

(65) Prior Publication Data
US 2023/0282881 A1 Sep. 7, 2023

(30) Foreign Application Priority Data
Jan. 30, 2022 (CN) .......................... 202210113581.4

(51) Int. Cl.
*H01M 10/0565* (2010.01)
*H01M 10/0525* (2010.01)
*H01M 50/46* (2021.01)

(52) U.S. Cl.
CPC ... *H01M 10/0565* (2013.01); *H01M 10/0525* (2013.01); *H01M 50/46* (2021.01); *H01M 2300/0082* (2013.01)

(58) Field of Classification Search
None
See application file for complete search history.

(56) References Cited

U.S. PATENT DOCUMENTS

| | | | |
|---|---|---|---|
| 10,319,978 B2 | 6/2019 | Zeng et al. | |
| 10,658,663 B2 | 5/2020 | Zhang et al. | |
| 10,714,756 B2 | 7/2020 | Dai et al. | |
| 10,944,100 B2 | 3/2021 | Liu et al. | |
| 11,121,375 B2 | 9/2021 | Hou et al. | |
| 11,145,922 B2 | 10/2021 | Li et al. | |
| 11,171,365 B2 | 11/2021 | Li et al. | |
| 11,205,798 B2 | 12/2021 | Li et al. | |
| 11,217,826 B2 | 1/2022 | Li et al. | |
| 11,295,901 B2 | 4/2022 | Hou et al. | |
| 11,358,647 B1 | 6/2022 | Newcomb et al. | |
| 11,374,257 B2 | 6/2022 | Hou et al. | |
| 11,383,771 B1 | 7/2022 | Newcomb et al. | |
| 11,404,714 B2 | 8/2022 | Hou et al. | |
| 11,735,768 B2 | 8/2023 | Frieberg | |
| 11,824,159 B2 | 11/2023 | Li et al. | |
| 11,967,722 B2 | 4/2024 | Su et al. | |
| 2004/0146785 A1* | 7/2004 | Mizutani | H01M 10/44 29/623.3 |
| 2020/0403267 A1 | 12/2020 | Li et al. | |
| 2021/0020929 A1 | 1/2021 | Kong et al. | |
| 2021/0036310 A1 | 2/2021 | Hou et al. | |
| 2021/0036360 A1 | 2/2021 | Li et al. | |
| 2021/0050596 A1 | 2/2021 | Li et al. | |
| 2021/0057776 A1 | 2/2021 | Lu et al. | |
| 2021/0111426 A1 | 4/2021 | Li et al. | |
| 2021/0135224 A1 | 5/2021 | Hou et al. | |
| 2022/0102756 A1 | 3/2022 | Frieberg et al. | |
| 2022/0123352 A1 | 4/2022 | Li et al. | |
| 2022/0140422 A1 | 5/2022 | Chen et al. | |
| 2022/0166031 A1 | 5/2022 | Li et al. | |
| 2022/0181598 A1 | 6/2022 | Lu et al. | |
| 2022/0181685 A1 | 6/2022 | Li et al. | |

(Continued)

FOREIGN PATENT DOCUMENTS

| | | | | |
|---|---|---|---|---|
| CN | 105811004 | A | * 7/2016 | |
| CN | 116565305 | A | 8/2023 | |
| DE | 102022118606 | A1 | 8/2023 | |
| EP | 1187245 | A2 | * 3/2002 | .......... H01M 50/105 |

OTHER PUBLICATIONS

Machine translation of CN 105611004 A, published on Jul. 27, 2016 (Year: 2016).*
Diethyl carbonate, available online at https://en.wikipedia.org/wiki/Diethyl_carbonate, date unavailable.*
Dimethyl carbonate, available online at https://en.wikipedia.org/wiki/Dimethyl_carbonate, date unavailable.*
Ethyl methyl carbonate, available online at https://www.sigmaaldrich.com/US/en/product/aldrich/754935?msockid=18b06b0c02236c103b5c7d1703fa6deb, date unknown.*

(Continued)

*Primary Examiner* — Anca Eoff
(74) *Attorney, Agent, or Firm* — Harness, Dickey & Pierce, P.L.C.

(57) ABSTRACT

A polymer gel electrolyte for an electrochemical cell that cycles lithium ions is provided. The polymer gel electrolyte includes a polymeric blend comprising polyvinylidene fluoride-hexafluoropropylene (PVDF-HFP) and polyvinylidene fluoride (PVDF), wherein a mass ratio of PVDF-HFP to PVDF is greater than or equal to about 1.5:1 to less than or equal to about 19:1 in the polymeric blend. Further, one or more plasticizers are included selected from the group consisting of: ethylene carbonate (EC), diethylene carbonate (DEC), vinyl ethylene carbonate (VEC), dimethylene carbonate (DMC), ethylmethylene carbonate (EMC), propylene carbonate (PC), gamma butyrolactone (GBL), diethylene glycol dimethyl ether (Diglyme), triethylene glycol dimethyl ether (Triglyme), tetraethylene glycol dimethyl ether (Tetraglyme), Triethyl Phosphate (TEP), 1-butyl-3-methylimidazolium-bis(trifluoromethylsulfonyl)imide (BMIM-TFSI), 1-Ethyl-3-methylimidazolium-bis(trifluoromethylsulfonyl)imide (EMI-TFSI), alkyl pyrrolidinium bis(trifluoromethanesulfonyl)imide (PY-TFSI), piperidinium bis(trifluoromethanesulfonyl)imide (PP-TFSI), N-alkyl-N-butylpyrrolidinium bis(trifluoromethanesulfonyl)imide (PYRA-TFSI), and combinations thereof. The polymer gel electrolyte also includes one or more lithium salts.

17 Claims, 5 Drawing Sheets

(56) References Cited

U.S. PATENT DOCUMENTS

| | | |
|---|---|---|
| 2022/0212449 A1 | 7/2022 | Newcomb et al. |
| 2022/0212723 A1 | 7/2022 | Newcomb et al. |
| 2022/0227425 A1 | 7/2022 | Newcomb et al. |
| 2022/0263055 A1 | 8/2022 | Hou et al. |
| 2022/0263129 A1 | 8/2022 | Lu et al. |
| 2022/0302526 A1 | 9/2022 | Li et al. |
| 2022/0407079 A1 | 12/2022 | Lu et al. |
| 2023/0015143 A1 | 1/2023 | Su et al. |
| 2023/0024667 A1 | 1/2023 | Li et al. |
| 2023/0025830 A1 | 1/2023 | Su et al. |
| 2023/0046608 A1 | 2/2023 | Su et al. |
| 2023/0074112 A1 | 3/2023 | Su et al. |
| 2023/0128413 A1 | 4/2023 | Frieberg et al. |
| 2023/0246172 A1 | 8/2023 | Li et al. |
| 2023/0246310 A1 | 8/2023 | Lu et al. |
| 2023/0253618 A1* | 8/2023 | Li ............ H01M 10/0525 429/303 |
| 2023/0268551 A1 | 8/2023 | Li et al. |
| 2023/0317966 A1 | 10/2023 | Li et al. |
| 2023/0335753 A1 | 10/2023 | Jiang et al. |

OTHER PUBLICATIONS

Bharathy S. Parimalam et al., "Reduction Reactions of Electrolyte Salts for Lithium Ion Batteries: LiPF6, LiBF4, LIDFOB, LiBOB, and LiTFSI", Journal of The Electrochemical Society, 165 (2), A251-A255, (2018).

T. Schedlbauer et al., "Lithium difluoro(oxalato)borate: A promising salt for lithium metal based secondary batteries?", Electrochimica Acta, vol. 92, pp. 102-107, (2013).

Bradley R. Frieberg et al.; U.S. Appl. No. 17/551,753, filed Dec. 15, 2021; entitled "Solid Electrolyte Coating of Lithium-Doped Silicon Oxide Particles as Anode Active Material"; 39 pages.

Bradley R. Frieberg; U.S. Appl. No. 17/171,489, filed Feb. 9, 2021; entitled "Gel Electrolyte for Solid-State Battery"; 68 pages.

Qili Su et al.; U.S. Appl. No. 17/710,213, filed Mar. 31, 2022; entitled "Polymeric Gel Electrolyte Systems for High-Power Solid-State Battery"; 62 pages.

Qili Su et al.; U.S. Appl. No. 17/560,673, filed Dec. 23, 2021; entitled "Folded Bipolar Battery Design"; 45 pages.

Zhe Li et al.; U.S. Appl. No. 17/458,903, filed Aug. 27, 2021; entitled "Anode-Free Solid-State Battery and Method of Battery Fabrication"; 28 pages.

Mengyan Hou et al.; U.S. Appl. No. 17/550,507, filed Dec. 14, 2021; entitled "Bipolar Solid-State Battery with Enhanced Interfacial Contact"; 65 pages.

Yong Lu et al.; U.S. Appl. No. 17/556,175, filed Dec. 20, 2021; entitled "Non-Flammable Solvate Ionic Liquid Electrolyte with Diluters"; 59 pages.

Zhe Li et al.; U.S. Appl. No. 17/683,976, filed Mar. 1, 2022; entitled "Self-Heating Bipolar Solid-State Battery"; 72 pages.

Qili Su et al.; U.S. Appl. No. 17/688,445, filed Mar. 7, 2022; entitled "Methods of Fabricating Bipolar Solid State Batteries"; 77 pages.

Qili Su et al.; U.S. Appl. No. 17/697,135, filed Mar. 17, 2022; entitled "Methods of Manufacturing Bipolar Solid-State Batteries"; 77 pages.

Qi Lu et al.; U.S. Appl. No. 17/698,865, filed Mar. 18, 2022; entitled "Bipolar Current Collector and Method of Making the Same"; 48 pages.

Zhe Li et al.; U.S. Appl. No. 17/707,524, filed Mar. 29, 2022; entitled "Argyrodite Solid Electrolytes for Solid-State Batteries and Methods of Making the Same"; 56 pages.

Qili Su et al.; U.S. Appl. No. 17/710,900, filed Mar. 31, 2022; entitled "Gel Electrolyte System for Solid State Battery"; 76 pages.

Zhe Li et al.; U.S. Appl. No. 17/738,767, filed May 6, 2022, entitled "Gel Polymer Electrolyte For Electrochemical Cell", 38 pages.

Meng Jiang et al.; U.S. Appl. No. 17/720,919, filed Apr. 14, 2022; entitled "Patterned Current Collector for Anodeless Electrochemical Battery Cells"; 48 pages.

Zhe Li et al.; U.S. Appl. No. 17/746,575, filed May 17, 2022; entitled "Lithiation Additive for Solid-State Battery Including Electrolyte"; 71 pages.

Zhe Li et al.; U.S. Appl. No. 17/853,690, filed Jun. 29, 2022; entitled "Porous Current Collectors for Negative Electrodes and Electrochemical Cells Including the Same"; 38 pages.

Yong Lu et al.; U.S. Appl. No. 17/696,567, filed Mar. 16, 2022; entitled "Designs of High-Power Gel-Assisted Bipolar Solid-State Battery"; 64 pages.

* cited by examiner

POLYMER BLEND GEL ELECTROLYTES

CROSS-REFERENCE TO RELATED APPLICATIONS

This application claims the benefit of Chinese Patent Application No. 202210113581.4 filed on Jan. 30, 2022. The entire disclosure of the application referenced above is incorporated herein by reference.

INTRODUCTION

This section provides background information related to the present disclosure which is not necessarily prior art.

The present disclosure pertains to polymer gel electrolytes for lithium-ion electrochemical cells and batteries having enhanced electrochemical performance.

Electrochemical energy storage devices, such as lithium-ion batteries, can be used in a variety of products, including automotive products such as start-stop systems (e.g., 12V start-stop systems), battery-assisted systems ("μBAS"), Hybrid Electric Vehicles ("HEVs"), and Electric Vehicles ("EVs"). Semi-solid and solid-state batteries have advantages over batteries that include liquid electrolytes, including a longer shelf life with lower self-discharge, simpler thermal management, a reduced need for packaging, and the ability to operate within a wider temperature window. For example, semi-solid electrolytes and/or solid-state electrolytes are generally non-volatile and non-flammable, and thus allow cells to be cycled under harsher conditions without experiencing diminished potential or thermal runaway, which can potentially occur with the use of liquid electrolytes. Further, such solid-state batteries tend to have a longer shelf life with lower self-discharge, simpler thermal management, a reduced need for packaging, and the ability to operate within a wider temperature window.

However, solid-state batteries generally experience comparatively low power capabilities. For example, such low power capabilities may be a result of interfacial resistance within the solid-state electrodes and/or at the electrode, and solid-state electrolyte layer interfacial resistance caused by limited contact, or void spaces, between the solid-state active particles and/or the solid-state electrolyte particles. Accordingly, it would be desirable to develop high-performance solid-state battery materials and methods that improve the contact and/or interaction between the solid-state active particles and/or the solid-state electrolyte particles (e.g., the micro-interfaces), the contact and/or interaction between the solid-state electrodes and solid-state electrolyte layer (e.g., the macro-interfaces), and/or mitigates the effects of the void spaces within the solid-state battery.

Moreover, all batteries suffer from diminished power generation when starting an engine in cold temperatures, often referred to as cold cranking amps (CCA). For example, the CCA rating refers to the current or number of amps a 12-volt battery can deliver at 0° F. for 30 seconds while maintaining a voltage of at least 7.2 volts. Thus, the higher the CCA rating, the greater the power of the battery generated at cold temperatures. Accordingly, it would be desirable to develop high-performance solid-state and/or semi-solid battery designs that can eliminate the need for use of liquid electrolytes that improve power capabilities, as well as energy density, especially at cold start temperatures and method of making the same.

SUMMARY

This section provides a general summary of the disclosure, and is not a comprehensive disclosure of its full scope or all of its features.

The present disclosure relates to a polymer gel electrolyte for an electrochemical cell that cycles lithium ions. In one aspect, the polymer gel electrolyte includes a polymeric blend including polyvinylidene fluoride-hexafluoropropylene (PVDF-HFP) and polyvinylidene fluoride (PVDF). A mass ratio of PVDF-HFP to PVDF may be greater than or equal to about 1.5:1 to less than or equal to about 19:1 in the polymeric blend. The polymer gel electrolyte also includes one or more plasticizers selected from the group consisting of: ethylene carbonate (EC), diethyl carbonate (DEC), vinyl ethylene carbonate (VEC), dimethyl carbonate (DMC), ethylmethyl carbonate (EMC), propylene carbonate (PC), gamma butyrolactone (GBL), diethylene glycol dimethyl ether (Diglyme), triethylene glycol dimethyl ether (Triglyme), tetraethylene glycol dimethyl ether (Tetraglyme), triethyl phosphate (TEP), 1-butyl-3-methylimidazolium-bis (trifluoromethylsulfonyl)imide (BMIM-TFSI), 1-ethyl-3-methylimidazolium-bis(trifluoromethylsulfonyl)imide (EMI-TFSI), alkyl pyrrolidinium bis(trifluoromethanesulfonyl)imide (PY-TFSI), piperidinium bis(trifluoromethanesulfonyl)imide (PP-TFSI), N-alkyl-N-butylpyrrolidinium bis(trifluoromethanesulfonyl)imide (PYRA-TFSI), and combinations thereof. The polymer gel electrolyte also includes one or more lithium salts.

In one aspect, the one or more lithium salts are independently selected from the group consisting of: lithium bis(trifluoromethanesulfonyl)imide (LiTFSI), lithium tetrafluoroborate (LiBF$_4$), lithium perchlorate (LiClO$_4$), lithium hexafluorophosphate (LiPF$_6$), lithium hexafluoroarsenate (LiAsF$_6$), lithium bis(fluorosulfonyl)imide (LiN(FSO$_2$)$_2$) (LiSFI), lithium bis(oxalato)borate (LiBOB), and combinations thereof.

In one aspect, the polymer gel electrolyte includes greater than or equal to about 2 weight % to less than or equal to about 40 weight % of the polymeric blend, greater than or equal to about 30 weight % to less than or equal to about 95 weight % of a total amount of the one or more plasticizers, and greater than or equal to about 3 weight % to less than or equal to about 40 weight % of a total amount of the one or more lithium salts.

In one aspect, the polymer gel electrolyte includes greater than or equal to about 1.9 weight % to less than or equal to about 37.5 weight % of the PVDF-HFP and greater than or equal to about 0.1 weight % to less than or equal to about 25 weight % of PVDF.

In one aspect, the polymer gel electrolyte includes greater than or equal to about 4 weight % to less than or equal to about 6 weight % of the polymeric blend, greater than or equal to about 74 weight % to less than or equal to about 83 weight % of the one or more plasticizers, and greater than or equal to about 12 weight % to less than or equal to about 21 weight % of the one or more lithium salts.

In one further aspect, the polymer gel electrolyte includes greater than or equal to about 28 weight % to less than or equal to about 34 weight % of ethylene carbonate (EC), greater than or equal to about 43 weight % to less than or equal to about 51 weight % of gamma butyrolactone (GBL), and optionally greater than or equal to about 2 weight % to less than or equal to about 3 weight % of vinyl ethylene carbonate (VEC).

In one aspect, the one or more plasticizers are selected from the group consisting of: ethylene carbonate (EC), vinyl ethylene carbonate (VEC), gamma butyrolactone (GBL), and combinations thereof.

In one aspect, the one or more plasticizers include ethylene carbonate (EC) and gamma butyrolactone (GBL) at a mass ratio of about 1:1.5.

In one aspect, the mass ratio of PVDF-HFP to PVDF is about 3:1.

In one aspect, the polymer gel electrolyte includes greater than or equal to about 3 weight % to less than or equal to about 7 weight % of the polymeric blend, the mass ratio of PVDF-HFP to PVDF is about 3:1. The polymer gel electrolyte also includes greater than or equal to about 74 weight % to less than or equal to about 84 weight % of the one or more plasticizers. The one or more plasticizers include ethylene carbonate (EC), gamma butyrolactone (GBL), and optionally vinyl ethylene carbonate (VEC), and greater than or equal to about 11 weight % to less than or equal to about 21 weight % of the one or more lithium salts. The one or more lithium salts include lithium bis(trifluoromethanesulfonyl)imide (LiTFSI), lithium tetrafluoroborate (LiBF$_4$), and lithium bis(oxalato)borate (LiBOB).

The present disclosure also relates to an electrochemical cell that cycles lithium ions having improved capacity retention. In one aspect, the electrochemical cell includes a positive electrode including a positive electroactive material, a negative electrode including a negative electroactive material, a porous interlayer disposed between the positive electrode and the negative electrode. The electrochemical cell also includes a polymer gel electrolyte including a polymeric blend including polyvinylidene fluoride-hexafluoropropylene (PVDF-HFP) and polyvinylidene fluoride (PVDF). A mass ratio of PVDF-HFP to PVDF is greater than or equal to about 1.5:1 to less than or equal to about 19:1 in the polymeric blend. One or more plasticizers may be present in the polymer gel electrolyte and selected from the group consisting of: ethylene carbonate (EC), diethyl carbonate (DEC), vinyl ethylene carbonate (VEC), dimethyl carbonate (DMC), ethylmethyl carbonate (EMC), propylene carbonate (PC), gamma butyrolactone (GBL), diethylene glycol dimethyl ether (Diglyme), triethylene glycol dimethyl ether (Triglyme), tetraethylene glycol dimethyl ether (Tetraglyme), triethyl phosphate (TEP), 1-butyl-3-methylimidazolium-bis(trifluoromethylsulfonyl)imide (BMIM-TFSI), 1-ethyl-3-methylimidazolium-bis(trifluoromethylsulfonyl)imide (EMI-TFSI), alkyl pyrrolidinium bis(trifluoromethanesulfonyl)imide (PY-TFSI), piperidinium bis(trifluoromethanesulfonyl)imide (PP-TFSI), N-alkyl-N-butylpyrrolidinium bis(trifluoromethanesulfonyl)imide (PYRA-TFSI), and combinations thereof. The polymer gel electrolyte may also include one or more lithium salts selected from the group consisting of: lithium bis(trifluoromethanesulfonyl)imide (LiTFSI), lithium tetrafluoroborate (LiBF$_4$), lithium perchlorate (LiClO$_4$), lithium hexafluorophosphate (LiPF$_6$), lithium hexafluoroarsenate (LiAsF$_6$), lithium bis(fluorosulfonyl)imide lithium (LiN(FSO$_2$)$_2$) (LiSFI), lithium bis(oxalato)borate (LiBOB), and combinations thereof.

In one aspect, the polymer gel electrolyte is included in one or more of the following:
 a) disposed on a surface of or within pores of the positive electrode;
 b) disposed on a surface of or within pores of the negative electrode;
 c) disposed on a surface of or within pores of the porous interlayer; or
 d) disposed as a coating on a surface of a solid state particle.

In one aspect, the polymer gel electrolyte is (a) disposed on a surface of or within pores of the positive electrode. The positive electrode includes a positive electroactive material selected from the group consisting of: a rock salt layered oxide, a spinel, a polyanion cathode, a lithium-transition metal oxide, a lithium-silicon alloying compound, lithium-tin alloying compound, lithium metal, lithium alloy, lithiated metal oxide/sulfide, lithium sulfide, sulfur, and combinations thereof.

In one aspect, the polymer gel electrolyte is (b) disposed on a surface of or within pores of the negative electrode. The negative electrode includes a negative electroactive material selected from the group consisting of: a carbonaceous material, a lithium-silicon alloying compound, lithium-tin alloying compound, lithium-titanate oxide, lithium metal, lithium alloy, and combinations thereof.

In one aspect, the polymer gel electrolyte is (c) disposed on a surface of or within pores of the porous interlayer. The porous interlayer is one of: a separator, a non-woven separator mat including at least one of polymeric fibers and/or glass fibers, a porous polymeric separator membrane including a polyolefin, a solid state electrolyte interlayer, or a free-standing gel polymer membrane.

In one aspect, the electrochemical cell further includes solid-state electrolyte particles. The polymer gel electrolyte may be (d) disposed as the coating on surfaces of the solid-state electrolyte particles.

In one aspect, the electrochemical cell further includes ceramic particles. The polymer gel electrolyte may be (d) disposed as the coating on surfaces of the ceramic particles.

The present disclosure further relates to a method of forming a polymer gel electrolyte in a component of an electrochemical cell that cycles lithium ions. The method may include introducing a liquid precursor of the polymer gel electrolyte into (i) pores of a porous component of a component to be incorporated into the electrochemical cell; (ii) onto particles to be incorporated into a component of the electrochemical cell; or both (i) and (ii). The liquid precursor includes: a polymeric blend including polyvinylidene fluoride-hexafluoropropylene (PVDF-HFP) and polyvinylidene fluoride (PVDF). A mass ratio of PVDF-HFP to PVDF is greater than or equal to about 1.5:1 to less than or equal to about 19:1 in the polymeric blend. The liquid precursor further includes a plasticizer selected from the group consisting of: ethylene carbonate (EC), diethyl carbonate (DEC), vinyl ethylene carbonate (VEC), dimethyl carbonate (DMC), ethylmethyl carbonate (EMC), propylene carbonate (PC), gamma butyrolactone (GBL), diethylene glycol dimethyl ether (Diglyme), triethylene glycol dimethyl ether (Triglyme), tetraethylene glycol dimethyl ether (Tetraglyme), triethyl phosphate (TEP), 1 butyl-3-methylimidazolium-bis(trifluoromethylsulfonyl)imide (BMIM-TFSI), 1-ethyl-3-methylimidazolium-bis(trifluoromethylsulfonyl)imide (EMI-TFSI), alkyl pyrrolidinium bis(trifluoromethanesulfonyl)imide (PY-TFSI), piperidinium bis(trifluoromethanesulfonyl)imide (PP-TFSI), N-alkyl-N-butylpyrrolidinium bis(trifluoromethanesulfonyl)imide (PYRA-TFSI), and combinations thereof. The liquid precursor also includes a lithium salt and a volatile carrier. The method further includes removing the volatile carrier to form the polymer gel electrolyte disposed in at least a portion of the pores of the component or defining a coating on the particles.

In one aspect, the liquid precursor is introduced into one or more of the following:
a) disposed on a surface of a positive electrode;
b) disposed within pores of the positive electrode;
c) disposed on a surface of a negative electrode;
d) disposed within pores of the negative electrode;
e) disposed on a surface of a separator; or
f) disposed within pores of the separator.

In one aspect, the polymer gel electrolyte includes greater than or equal to about 3 weight % to less than or equal to about 7 weight % of the polymeric blend. The mass ratio of PVDF-HFP to PVDF is about 3:1. The polymer gel electrolyte may have greater than or equal to about 74 weight % to less than or equal to about 84 weight % of the one or more plasticizers. The one or more plasticizers include ethylene carbonate (EC), gamma butyrolactone (GBL), and optionally vinyl ethylene carbonate (VEC). The polymer gel electrolyte also includes greater than or equal to about 11 weight % to less than or equal to about 21 weight % of the lithium salt. The one or more lithium salts include lithium bis(trifluoromethanesulfonyl)imide (LiTFSI), lithium tetrafluoroborate (LiBF$_4$), and lithium bis(oxalato)borate (LiBOB).

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5 shows a comparison of capacity retention (%) versus cycle number for coin test cells having three distinct polymer gel electrolytes at these discharge rates.

FIG. 7 shows capacity retention (%) versus cycles.

Corresponding reference numerals indicate corresponding parts throughout the several views of the drawings.

DETAILED DESCRIPTION

Figure 1:
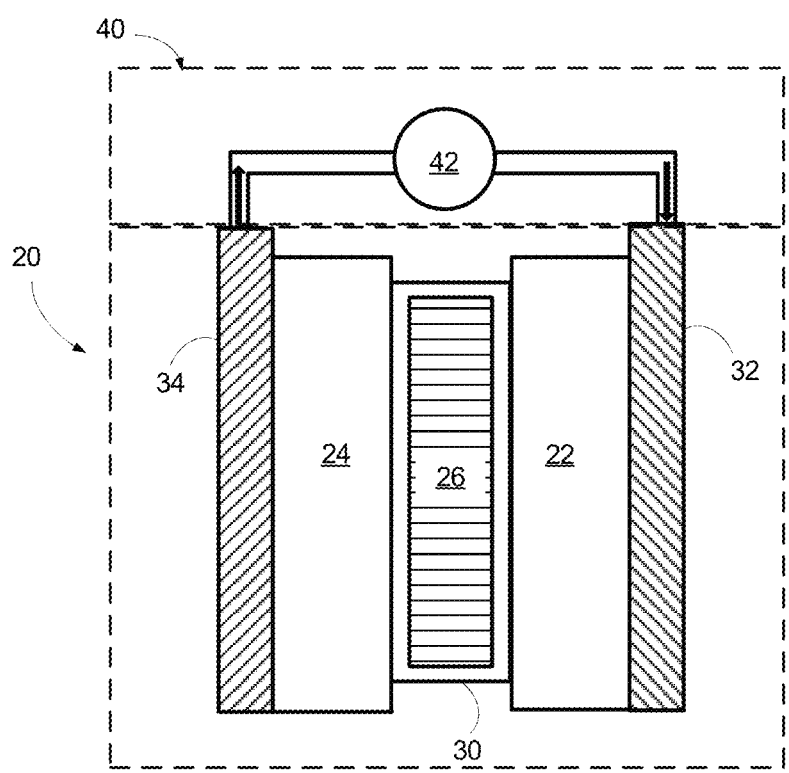
FIG. 1 is a simplified schematic illustration of an electrochemical battery cell for cycling lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges within or given for the ranges.

Example embodiments will now be described more fully with reference to the accompanying drawings.

The present disclosure provides polymer gel electrolytes and methods of making such polymer gel electrolytes. Electrochemical cells that incorporate such polymer gel electrolytes exhibit improved electrochemical performance over solid electrolyte particles due to decreased contact resistance. As discussed above, solid-state batteries using solid electrolyte particles often suffer from high contact resistance at the particle-to-particle interface. This contact resistance ultimately limits the rate capabilities that are needed for fulfilling fast charge and power applications. Currently available gel electrolytes do not appear to provide both sufficient low temperature cranking performance and non-flowing semi-solid, but instead require some amount of flowing liquid electrolyte to achieve sufficient performance. As noted above, the presence of flowable liquid electrolyte in an electrochemical cell poses its own challenges, including potential leakage and reduced thermal stability. The present disclosure contemplates a new gel electrolyte composition that can provide an electrochemical cell(s) for a lithium ion battery that is non-flowing/free of flowing liquid electrolyte, but further achieves desired electrochemical performance, including cold crank performance exhibited by desirable cold cranking amps (CCA).

A composition of polymer gel electrolyte provided in accordance with the present disclosure includes a blend of polymers, at least one liquid plasticizer, and at least one lithium salt. When incorporated into an electrochemical cell, the specific blend of polymers can synergistically improve the electrochemical performance over either polymer component individually. The polymer gel electrolyte can be embedded directly within porous components of the electrochemical cell/battery, such as within or on an electrode, used in combination with solid particles as a coating, or injected in a traditional porous separator, by way of non-limiting example.

In various aspects, a polymer gel electrolyte for an electrochemical cell that cycles lithium ion includes a blend of polymers that serve as a polymer host for an electrolyte comprising a lithium salt. In particular, the polymeric blend comprises polyvinylidene fluoride-hexafluoropropylene (PVDF-HFP) and polyvinylidene fluoride (PVDF). The polymer gel electrolyte includes at least one lithium salt and in certain aspects, combinations of distinct lithium salts. The polymer gel electrolyte also has at least one plasticizer and in certain aspects, combinations of distinct plasticizers.

The polymeric blend has a mass ratio of PVDF-HFP to PVDF of greater than or equal to about 1.5:1 to less than or equal to about 19:1 in the polymeric blend, optionally greater than or equal to about 2:1 to less than or equal to about 17:1, optionally greater than or equal to about 2:1 to less than or equal to about 15:1, optionally greater than or equal to about 2:1 to less than or equal to about 10:1, optionally greater than or equal to about 2:1 to less than or equal to about 9:1, optionally greater than or equal to about 2:1 to less than or equal to about 8:1, optionally greater than or equal to about 2:1 to less than or equal to about 7:1, optionally greater than or equal to about 2:1 to less than or equal to about 6:1, optionally greater than or equal to about 2:1 to less than or equal to about 5:1, optionally greater than or equal to about 2.5:1 to less than or equal to about 4:1, optionally greater than or equal to about 2.5:1 to less than or equal to about 4.5:1, and in certain aspects, about 3:1 in the polymeric blend.

In certain aspects, the one or more plasticizers are selected from the group consisting of: ethylene carbonate (EC), diethyl carbonate (DEC), vinyl ethylene carbonate (VEC), dimethyl carbonate (DMC), ethylmethyl carbonate (EMC), propylene carbonate (PC), gamma butyrolactone (GBL), diethylene glycol dimethyl ether (Diglyme), triethylene glycol dimethyl ether (Triglyme), tetraethylene glycol dimethyl ether (Tetraglyme), triethyl phosphate (TEP), 1-butyl-3-methylimidazolium-bis(trifluoromethylsulfonyl)imide (BMIM-TFSI), 1-ethyl-3-methylimidazolium-bis(trifluoromethylsulfonyl)imide (EMI-TFSI), alkyl pyrrolidinium bis(trifluoromethanesulfonyl)imide (PY-TFSI), piperidinium bis(trifluoromethanesulfonyl)imide (PP-TFSI), N-alkyl-N-butylpyrrolidinium bis(trifluoromethanesulfonyl)imide (PYRA-TFSI), and combinations thereof. In certain aspects, the one or more plasticizers are selected from the group consisting of: ethylene carbonate (EC), gamma butyrolactone (GBL), vinyl ethylene carbonate (VEC), and combinations thereof. In one variation, the one or more plasticizers comprise ethylene carbonate (EC) and gamma butyrolactone (GBL) present at a mass ratio of about 1:1.5 (or 4:6).

The one or more lithium salts may be selected from the group consisting of: lithium bis(trifluoromethanesulfonyl) imide (LiTFSI), lithium tetrafluoroborate (LiBF$_4$), lithium perchlorate (LiClO$_4$), lithium hexafluorophosphate (LiPF$_6$), lithium hexafluoroarsenate (LiAsF$_6$), lithium bis(fluorosulfonyl)imide (LiN(FSO$_2$)$_2$) (LiSFI), lithium bis(oxalato)borate (LiBOB), and combinations thereof. In certain variations, the one or more lithium salts are selected from the group consisting of: lithium bis(trifluoromethanesulfonyl) imide (LiTFSI), lithium tetrafluoroborate (LiBF$_4$), lithium bis(oxalato)borate (LiBOB), and combinations thereof. In one variation, the one or more lithium salts comprise lithium bis(trifluoromethanesulfonyl)imide (LiTFSI), lithium tetrafluoroborate (LiBF$_4$), and lithium bis(oxalato)borate (LiBOB).

In certain aspects, the polymer gel electrolyte comprises greater than or equal to about 2 weight % to less than or equal to about 40 weight % of the polymeric blend, greater than or equal to about 30 weight % to less than or equal to about 95 weight % of a total amount of the one or more plasticizers, and greater than or equal to about 3 weight % to less than or equal to about 40 weight % of a total weight of the one or more lithium salts. In certain variations, the polymer gel electrolyte comprises greater than or equal to about 4 weight % to less than or equal to about 6 weight % of the polymeric blend, greater than or equal to about 74 weight % to less than or equal to about 83 weight % of a total amount of the one or more plasticizers, and greater than or equal to about 12 weight % to less than or equal to about 21 weight % of the one or more lithium salts.

In one variation, the polymer gel electrolyte comprises greater than or equal to about 3 weight % to less than or equal to about 7 weight % of the polymeric blend, optionally greater than or equal to about 4 weight % to less than or equal to about 6 weight %, for example, about 5 weight % of the polymeric blend, greater than or equal to about 81 weight % to less than or equal to about 83 weight % of a total amount of the one or more plasticizers, for example, about 82 weight % of the one or more plasticizers, and greater than or equal to about 12 weight % to less than or equal to about 14 weight % of the one or more lithium salts, for example, about 13 weight % of the one or more lithium salts. In one embodiment, the polymer gel electrolyte comprises one or more plasticizers as greater than or equal to about 31 weight % to less than or equal to about 34 weight % of ethylene carbonate (EC), for example, about 33 weight % EC and greater than or equal to about 48 weight % to less than or equal to about 51 weight % of gamma butyrolactone (GBL), for example, about 49 weight % GBL. Such a plasticizer has a mass ratio of EC to GBL of about 1:1.5 (or 4:6).

In another variation, the polymer gel electrolyte comprises greater than or equal to about 3 weight % to less than or equal to about 7 weight % of the polymeric blend, optionally greater than or equal to about 4 weight % to less than or equal to about 6 weight %, for example, about 5 weight % of the polymeric blend, greater than or equal to about 74 weight % to less than or equal to about 77 weight % of a total amount of the one or more plasticizers, for example, about 75.5 weight % of the one or more plasticizers, and greater than or equal to about 12 weight % to less than or equal to about 21 weight % of the one or more lithium salts, for example, about 19.5 weight % of the one or more lithium salts. In one embodiment, the polymer gel electrolyte comprises one or more plasticizers as greater than or equal to about 28 weight % to less than or equal to about 34 weight % of ethylene carbonate (EC), for example, about 29 weight % EC, greater than or equal to about 43 weight % to less than or equal to about 51 weight % of gamma butyrolactone (GBL), for example, about 44 weight % GBL, and optionally greater than or equal to about 2 weight % to less than or equal to about 3 weight % of vinyl ethylene carbonate (VEC), for example, about 2.5 weight % VEC. Such a plasticizer has a ratio of EC to GBL of about 1:1.5 (or 4:6).

In certain variations, the polymer gel electrolyte comprises greater than or equal to about 1.9 weight % to less than or equal to about 37.5 weight % of the PVDF-HFP and greater than or equal to about 0.1 weight % to less than or equal to about 25 weight % of PVDF. In one variation, the polymer gel electrolyte comprises greater than or equal to about 3 weight % to less than or equal to about 5 weight % of the PVDF-HFP, optionally greater than or equal to about 3.25 weight % to less than or equal to about 4.25 weight %, optionally greater than or equal to about 3.5 weight % to less than or equal to about 4 weight %, and optionally about 3.75 weight % of the PVDF-HFP. The polymer gel electrolyte also includes greater than or equal to about 0.5 weight % to less than or equal to about 2.5 weight % of PVDF, optionally greater than or equal to about 0.75 weight % to less than or equal to about 2 weight % of PVDF, optionally greater than or equal to about 1 weight % to less than or equal to about 1.5 weight %, and optionally about 1.25 weight % of PVDF in the polymer gel electrolyte. Such a polymeric blend may have a mass ratio of PVDF-HFP to PVDF of about 3:1.

In one particular variation, the polymer gel electrolyte comprises greater than or equal to about 3 weight % to less than or equal to about 7 weight % of the polymeric blend, for example, optionally about 5 weight %, wherein the mass ratio of PVDF-HFP to PVDF is about 3:1. The polymer gel electrolyte also comprises greater than or equal to about 74 weight % to less than or equal to about 84 weight % of the plasticizer(s), for example, optionally about 75.5 weight % or optionally about 82 weight % of the plasticizer(s). The one or more plasticizers comprise ethylene carbonate (EC), gamma butyrolactone (GBL), and optionally vinyl ethylene carbonate (VEC). The polymer gel electrolyte also comprises greater than or equal to about 11 weight % to less than or equal to about 21 weight % of the lithium salt, for example, optionally about 13 weight % or optionally about 19.5 weight %. The lithium salt comprises lithium bis (trifluoromethanesulfonyl)imide (LiTFSI), lithium tetrafluoroborate (LiBF$_4$), lithium bis(oxalato)borate (LiBOB), and combinations thereof.

In one variation, the polymer gel electrolyte has a composition as follows. A polymer blend comprising PVDF-HFP and PVDF at a ratio of 3:1 at about 5 weight %. About 82% of plasticizers, which include EC and GBL at a ratio of about 4:6. Lithium salts are present in a total amount of about 12.8 weight %, with about 5.15 weight % of LiTFSI (0.4M), about 5.15 weight % LiBF$_4$ (0.4 M) and about 2.5 weight % LiBOB.

In another variation, the polymer gel electrolyte has a composition as follows. A polymer blend comprising PVDF-HFP and PVDF at a ratio of 3:1 at about 5 weight %. The electrolyte also has about 75.5% of plasticizers, which includes 73 weight % of EC and GBL present at a ratio of about 4:6. The plasticizers also include about 2.5 weight % of VEC. Lithium salts are present in a total amount of about 19.5 weight %, with about 9.25 weight % of LiTFSI (0.8M), about 9.25 weight % LiBF$_4$ (0.8 M) and about 1 weight % LiBOB.

The polymer gel electrolyte may have an ionic conductivity of greater than or equal to about 0.1 mS/Cm, optionally greater than or equal to about 0.5 mS/Cm, optionally greater than or equal to about 1 mS/Cm, optionally greater than or equal to about 2 mS/Cm, optionally greater than or equal to about 3 mS/Cm, optionally greater than or equal to about 4 mS/Cm, optionally greater than or equal to about 5 mS/Cm, optionally greater than or equal to about 6 mS/Cm, optionally greater than or equal to about 7 mS/Cm, optionally greater than or equal to about 8 mS/Cm, and optionally greater than or equal to about 9 mS/Cm. In certain variations, the polymer gel electrolyte may have an ionic conductivity of greater than or equal to about 0.1 mS/Cm to less than or equal to about 10 mS/cm.

In various aspects, such a polymer gel electrolyte may be incorporated into an electrochemical cell that cycles lithium ions having improved capacity retention. As will be described further herein, the electrochemical cell includes a positive electrode comprising a positive electroactive material, a negative electrode comprising a negative electroactive material, and optionally a separator, such as a porous polymeric separator, disposed between the positive electrode and the negative electrode. In alternative aspects, in lieu of or in addition to a porous polymeric separator, a solid state electrolyte layer or a free-standing gel electrolyte membrane may be incorporated between the positive and negative electrode to provide electrical insulation/separation, while facilitating flow of ions therebetween.

Notably, electrochemical cells and batteries prepared in accordance with certain aspects of the present disclosure may be free of liquid electrolytes and only contain solid-state and/or semi-solid or gel electrolytes. While liquid electrolyte is used initially as a precursor to form the polymeric gel electrolyte of the present disclosure, the liquid electrolyte is imbibed into and specifically interacts with the polymeric host, for example, by bonding with the polymeric blend polymers via hydrogen bonding, Van der Waals forces, and the like. Thus, the liquid electrolyte (comprising the plasticizer and lithium salt) is bound and no longer flows, thus serving as part of the gel electrolyte through the bonding with the surrounding polymer host matrix. As a result, the incorporated liquid electrolyte provides a non-flowing property, in contrast to conventional liquid electrolyte that flows within pores of conventional separators and electrodes. By replacing liquid electrolyte with non-flammable gel electrolyte that does not flow within the battery, the thermal stability of the battery provided in accordance with certain aspects of the present disclosure is greatly enhanced.

By way of background, an exemplary and schematic illustration of an electrochemical cell (also referred to as a battery) 20 is shown in FIG. 1. Although the illustrated examples include a single positive electrode or cathode and a single negative electrode or anode, the skilled artisan will recognize that the present disclosure also contemplates various other configurations, including those having one or more cathodes and one or more anodes, as well as various current collectors with electroactive layers disposed on or adjacent to one or more surfaces thereof.

A typical lithium-ion battery 20 includes a first electrode (such as a negative electrode 22 or anode) opposing a second electrode (such as a positive electrode 24 or cathode) and an electrically insulating and ionically conductive interlayer, such as separator 26 and/or electrolyte 30 disposed therebetween. While not shown, often in a lithium-ion battery pack, batteries or cells may be electrically connected in a stack or winding configuration to increase overall output. Lithium-ion batteries operate by reversibly passing lithium ions between the first and second electrodes. For example, lithium ions may move from the positive electrode 24 to the negative electrode 22 during charging of the battery, and in the opposite direction when discharging the battery. The electrolyte 30 is suitable for conducting lithium ions and may be in gel (semi-solid) or solid form.

When a semi-liquid/gel electrolyte is used, the separator 26 (e.g., a microporous polymeric separator) may be thus disposed between the two electrodes 22, 24 and may comprise the electrolyte 30, within at least a portion of the pores of the separator 26, which may also be present in the pores of the negative electrode 22 and positive electrode 24. When a solid electrolyte is used (formed with a plurality of solid-state electrolyte particles not shown here), the microporous polymeric separator 26 may be omitted. The solid-state electrolyte particles may also be mixed into the negative electrode 22 and the positive electrode 24. In other variations not shown here, a free-standing polymeric gel separator membrane having pores may be used as a porous interlayer/separator.

A negative electrode current collector 32 may be positioned at or near the negative electrode 22 and a positive electrode current collector 34 may be positioned at or near the positive electrode 24. An interruptible external circuit 40 and a load device 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte 30 to form intercalated or alloyed lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of transition metal ions, at the positive electrode 24 so that electrons and lithium ions are produced. The lithium ions flow from the positive electrode 24 through the electrolyte 30 across the separator 26 to replenish the negative electrode 24 with lithium for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. The negative electrode current collector 32 and positive electrode current collector 34 respectively collect and move free electrons to and from an external circuit 40.

Further, as noted above, when a liquid or semi-liquid electrolyte is used, the separator 26 operates as an electrical insulator by being disposed between the negative electrode 22 and the positive electrode 24 to prevent physical contact and thus, the occurrence of a short circuit. The separator 26 provides not only a physical and electrical barrier between the two electrodes 22, 24, but also may contain the electrolyte in a network of open pores during the cycling of lithium ions, to facilitate functioning of the battery 20. The solid-state electrolyte layer may serve a similar ion conductive and electrically insulating function, but without needing a separator 26 component.

The battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a semi-solid electrolyte 30 and shows representative concepts of battery operation. However, the battery 20 may also be a solid-state battery that includes a solid-state electrolyte that may have a different design, as known to those of skill in the art.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

The present technology pertains to making improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

The positive electrode 24, the negative electrode 22, and the separator 26 may each include a gel electrolyte 30 inside at least a portion of their pores, capable of conducting lithium ions between the negative electrode 22 and the positive electrode 24. However, additional appropriate electrolyte 30, whether in solid, liquid, or gel form, capable of conducting lithium ions between the negative electrode 22 and the positive electrode 24 may be used in the lithium-ion battery 20. In certain alternative aspects, in addition to the polymer gel, the electrolyte 30 may also include a solid-state electrolyte particles or non-aqueous liquid electrolyte solution that includes a lithium salt dissolved in an organic solvent or a mixture of organic solvents that flows (and does not interact with the polymeric host blend in the gel electrolyte). However, in certain aspects, the electrochemical cells prepared in accordance with the present disclosure are free of flowing liquid electrolyte to provide the performance advantages discussed above.

The porous separator 26 may include, a non-woven mat comprising polymeric fibers or glass fibers, a porous polymeric membrane comprising a polyolefin, such as polypropylene, polyethylene, including multiple layers. The non-woven mat or polymeric membrane may be coated with ceramic particles.

In certain instances, a microporous polymeric separator includes a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

In certain aspects, the separator 26 may further include one or more of a ceramic coating layer comprising ceramic particles and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), and combinations thereof. The heat-resistant material may be selected from the group consisting of: NOMEX™ aramid, ARAMID polyamide, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26.

The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

In lieu of a traditional separator, while not shown, a free-standing elastic gel separator interlayer may be disposed between the negative electrode 22 and the positive electrode 24. Such a polymeric gel separator layer may be a gel-like solid (or semi-solid) electrolyte in which an electrolyte (e.g., a salt in a solvent) is held in a matrix or network, for example, by interacting via bonding forces with the surrounding polymeric matrix. The gel separator layers may be porous and can provide electrical separation between electrodes of opposite polarities, but to permit ions to flow therethrough. The free-standing gel separator layer(s) may serve the role of both electrical insulator and ion conductor and thus eliminate the need for a traditional porous separator layer. The free-standing polymeric gel separator layer may be porous, but has comparatively lower porosity than a conventional polyolefin separator.

In other variations, the porous separator 26 and the electrolyte 30 in FIG. 1 may be replaced with a solid-state electrolyte (SSE) (not shown) that functions as both an electrolyte and a separator. The SSE may be disposed between the positive electrode 24 and negative electrode 22. The SSE facilitates transfer of lithium ions, while mechanically separating and providing electrical insulation between the negative and positive electrodes 22, 24. The SSE may be a solid-state inorganic compound or a solid-state polymer electrolyte.

By way of non-limiting example, solid-state electrolyte particles may include oxide-based solid electrolyte particles, sulfide-based solid electrolytes, nitride-based solid electrolytes, hydride-based solid electrolytes, halide-based solid electrolytes, borate-based solid electrolytes, and combinations thereof. More specifically, examples of suitable solid electrolyte particles include garnet type oxides (e.g., $Li_7La_3Zr_2O_{12}$ (LLZO)), perovskite type (e.g., $Li_3xLa_{2/3}$-$xTiO_3$), NASICON type (e.g., $Li_{1.4}Al_{0.4}Ti_{1.6}(PO_4)_3$ and $Li_{1+x}Al_xGe_{2-x}(PO_4)_3$ where $0≤x≤2$, LISICON type (e.g., $Li_{2+2x}Zn_{1-x}GeO_4$ where $0≤x≤1$), metal-doped or aliovalent-substituted oxide solid electrolyte, such as Al-doped or Nb-doped $Li_7La_3Zr_2O_{12}$, Sb-doped $Li_7La_3Zr_2O_{12}$, Ga-substituted $Li_7La_3Zr_2O_{12}$, Cr and V-substituted $LiSn_2P_3O_{12}$, Al-substituted perovskite, $Li_{1+x+y}Al_xTi_{2-x}Si_yP_{3-y}O_{12}$ where $0≤x≤2$ and $0≤y≤3$, sulfide-based solid electrolyte, e.g., $Li_2S$—$P_2S_5$ system, $Li_2S$—$P_2S_5$-$MO_x$ system, where M is a metal element, such as zinc (Zn), tin (Sn), and the like and X is 2, $Li_{10}GeP_2S_{12}$ (LGPS), thio-LISICON ($Li_{3.25}Ge_{0.25}P_{0.75}S_4$), $Li_{3.4}Si_{0.4}P_{0.6}S_4$, $Li_{10}GeP_2S_{11.7}O_{0.3}$, lithium argyrodite $Li_6PS_5X$ where X is a halide, such as Cl, Br, or I, $Li_{9.54}Si_{1.74}P_{1.44}S_{11.7}Cl_{0.3}$, $Li_{9.6}P_3S_{12}$, $Li_7P_3S_{11}$, $Li_9P_3S_9O_3$, $Li_{10.35}Ge_{1.35}P_{1.65}S_{12}$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.166}S_4$, LiI—$Li_4SnS_4$, and $Li_4SnS_4$, $Li_3N$, $Li_7PN_4$, $LiSi_2N_3$, hydride-based solid electrolyte, like $LiBH_4$, $LiBH_4$—LiX, where X is Cl, Br or I, $LiNH_2$, $Li_2NH$, $LiBH_4$—$LiNH_2$, $Li_3AlH_6$, a halide-based solid electrolyte, LiI, $Li_3InCl_6$, $Li_2CdC_{14}$, $Li_2MgCl_4$, $Li_2CdI_4$, $Li_2ZnI_4$, $Li_3OCl$, borate-based solid electrolytes, e.g., $Li_2B_4O_7$, $Li_2O$—$B_2O_3$—$P_2O_5$, and any combinations thereof. In addition to forming an electrolyte layer between the positive and negative electrodes 22, 24, solid electrolyte particles like those described above may be included in the electrodes themselves (for example, mixed in with other components distributed within a polymeric binder matrix to form a composite electrode).

The negative electrode 22 includes an electroactive material this is a lithium host material capable of functioning as a negative terminal of a lithium ion battery. The negative electrode 22 may be formed from a lithium host material that is capable of functioning as a negative terminal of a lithium-ion battery. The negative electrode 22 may be a layer of the negative electroactive material or may be a porous electrode composite and include the negative electrode active material and, optionally, an electrically conductive material or other filler, such as the solid state electrolyte particles, as well as one or more polymeric binder materials to structurally hold the lithium host electroactive material particles together.

In certain variations, the negative electrode 22 is a film or layer formed of a negative electroactive material, such as carbonaceous materials, graphite, lithium-silicon and silicon containing binary and ternary alloys and/or tin-containing alloys, lithium metal, alloys of lithium metal, and other lithium-accepting anode materials.

In certain variations, the negative electrode active material comprises a carbonaceous particle or fiber containing carbon. Suitable carbon particles include graphite, hard carbon, soft carbon, and graphene, by way of non-limiting example. Other examples include silicon, silicon mixed with graphite, transition-metal (e.g., Sn) and alloys thereof, such as Si—Sn, SiSnFe, SiSnAl, SiFeCo, $SnO_2$, metal oxide/sulfide (e.g., $TiO_2$, FeS and the like), lithium-titanium anode materials, such as $Li_{4+x}Ti_5O_{12}$, where $0≤x≤3$, including lithium titanate ($Li_4Ti_5O_{12}$) (LTO), by way of non-limiting example. Thus, negative electroactive materials for the negative electrode 22 may be selected from the group consisting of: lithium, carbonaceous materials, like graphite, graphene, hard carbon, soft carbon, a carbonaceous material, a lithium-silicon alloying compound, lithium-tin alloying compound, lithium metal, lithium alloy, metal oxide, metal sulfide, lithium-titanium compounds, and combinations thereof and combinations thereof.

Such negative electrode active materials may be optionally intermingled with an electrically conductive material that provides an electron conduction path and/or at least one polymeric binder material that improves the structural integrity of the negative electrode 22. By way of non-limiting example, the negative electrode 22 may include an active material including electroactive material particles (e.g., graphite particles) intermingled with a polymeric binder material. The polymeric binder material may be selected from the group consisting of polyvinylidene fluoride (PVDF), polytetrafluoroethylene (PTFE), ethylene propylene diene monomer (EPDM) rubber, carboxymethoxyl cellulose (CMC), nitrile butadiene rubber (NBR), lithium polyacrylate (LiPAA), sodium polyacrylate (NaPAA), polyacrylic acid, polytetrafluoroethylene (PTFE), polyethylene (PE), polyamide, polyimide, sodium alginate, lithium alginate, and combinations thereof, by way of example.

Additional suitable electrically conductive materials may include carbon-based materials or a conductive polymer. Carbon-based materials may include, by way of non-limiting example, particles of KETCHEN™ black, DENKA™ black, acetylene black, carbon black, graphene, carbon nanotubes, carbon nanofibers, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of conductive materials may be used. As noted above, optionally solid-state electrolyte particles may be incorporated into the negative electrode 22.

A composite negative electrode may comprise the negative electrode active material present at greater than about 60 wt. % of the overall weight of the electroactive material of the electrode (not including the weight of the current collector), optionally greater than or equal to about 65 wt. %, optionally greater than or equal to about 70 wt. %, optionally greater than or equal to about 75 wt. %, optionally greater than or equal to about 80 wt. %, optionally greater than or equal to about 85 wt. %, optionally greater than or equal to about 90 wt. %, and in certain variations, optionally greater than or equal to about 95% of the overall weight of the electroactive material layer of the electrode.

The binder may be present in the negative electrode 22 at greater than or equal to about 1 wt. % to less than or equal to about 20 wt. %, optionally greater than or equal to about 1 wt. % to less than or equal to about 10 wt. %, optionally greater than or equal to about 1 wt. % to less than or equal to about 8 wt. %, optionally greater than or equal to about 1 wt. % to less than or equal to about 7 wt. %, optionally greater than or equal to about 1 wt. % to less than or equal to about 6 wt. %, optionally greater than or equal to about 1 wt. % to less than or equal to about 5 wt. %, or optionally greater than or equal to about 1 wt. % to less than or equal to about 3 wt. % of the total weight of the electroactive material layer of the electrode.

In certain variations, the negative electrode 22 includes the electrically-conductive material at less than or equal to about 20 wt. %, optionally less than or equal to about 15 wt. %, optionally less than or equal to about 10 wt. %, optionally less than or equal to about 5 wt. %, optionally less than or equal to about 1 wt. %, or optionally greater than or equal to about 0.5 wt. % to less than or equal to about 8 wt. % of the total weight of the electroactive material layer of the negative electrode.

The negative electrode current collector 32 can comprise metal, for example, it may be formed from copper (Cu), nickel (Ni), or alloys thereof or any other appropriate electrically conductive material known to those of skill in the art.

The negative electrode current collector 32 and/or positive electrode current collector 34 may be in the form of a foil, slit mesh, expanded metal a metal grid or screen, and/or woven mesh.

In various aspects, the positive electrode 24 may include a positive electroactive material, like a lithium-based electroactive material, which can sufficiently undergo lithium intercalation and deintercalation, or alloying and dealloying, while functioning as the positive terminal of the battery. Examples of positive electroactive materials include those selected from the group consisting of: a layered-oxide (e.g., rock salt layered oxide), a spinel, a polyanion cathode, a lithium-transition metal oxide, lithiated metal oxide/sulfide, lithium sulfide, sulfur, and combinations thereof.

One exemplary common class of known materials that can be used to form the electroactive material layer of the positive electrode is layered lithium transitional metal oxides. For example, rock salt layered oxides include $LiCoO_2$, $LiNi_xMn_yCo_{1-x-y}O_2$ (where $0 \leq x \leq 1$ and $0 \leq y \leq 1$), $LiNi_xMn_yAl_{1-x-y}O_2$ (where $0 < x \leq 1$ and $0 < y \leq 1$), $LiNi_xMn_{1-x}O_2$ (where $0 \leq x \leq 1$), and $Li_{1+x}MO_2$ (where $0 \leq x \leq 1$). Suitable spinel positive electroactive materials may include $LiMn_2O_4$ and $LiNi_{0.5}Mn_{1.5}O_4$. A polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)_3F_3$ for lithium-ion batteries, and/or a silicate, such as $LiFeSiO_4$ for lithium-ion batteries. Any other transition metal oxide positive electroactive materials are also contemplated. Low voltage positive electroactive materials may include lithiated metal oxide/sulfide (e.g., $LiTiS_2$), lithium sulfide, sulfur, and the like. In certain aspects, the positive solid-state electroactive particles may be doped (for example, by aluminum and/or magnesium). In certain other aspects, the positive electroactive materials may have a coating disposed over each particle surface. For example, the coating may be a carbon containing, oxide containing (e.g., aluminum oxide, $LiNbO_3$), fluoride containing, nitride containing or polymeric thin coating disposed over the electroactive material. The coating may be ionically conductive and optionally electrically conductive. The coating may also be applied over the composite electrode (electroactive material layer) after formation in alternative variations.

The positive electroactive materials may be particulate or powder compositions. The positive electroactive material particles may be intermingled with the polymeric binder and electrically conductive materials, like those described above in the context of the negative electrode 22. Similar amounts of positive electroactive material particles, electrically conductive materials, and binder may be used as described above in the context of the negative electroactive material particles and other components of the negative electrode 22 and for brevity will not be repeated herein.

The positive electrode current collector 34 may be formed from aluminum or any other appropriate electrically conductive material known to those of skill in the art. It may have any of the forms described above in the context of the negative electrode current collector 32.

A porosity of the composite electroactive material layer, whether the negative electrode 22 or positive electrode 24 after all processing is completed (including consolidation and calendering) may considered to be a fraction of void volume defined by pores over the total volume of the electroactive material layer. The porosity may be greater than or equal to about 15% by volume to less than or equal to about 50% by volume, optionally greater than or equal to 20% by volume to less than or equal to about 40% by volume, and in certain variations, optionally greater than or equal to 25% by volume to less than or equal to about 35% by volume.

In certain aspects of the present disclosure, at least one of the positive electrode 24 and the negative electrode 22 is modified in accordance with certain principles of the present teachings. For example, the present disclosure provides an electrochemical cell that cycles lithium ions having improved capacity retention that has a positive electrode comprising a positive electroactive material, a negative electrode comprising a negative electroactive material, and optionally a separator disposed between the positive electrode and the negative electrode, and a polymer gel electrolyte as described above that includes the polymer blend of PVDF-HFP and PVDF, one or more plasticizers, and one or more lithium salts. The polymer gel electrolyte may be included in one or more of the following: disposed on a surface of or within pores of the positive electrode; disposed on a surface of or within pores of the negative electrode; disposed on a surface of or within pores of the separator, or disposed as a coating on a surface of a solid-state particle that is ultimately incorporated into a component of the electrochemical cell (for example, an electroactive material particle or a solid-state electrolyte particle incorporated into an electrode).

Figure 2:
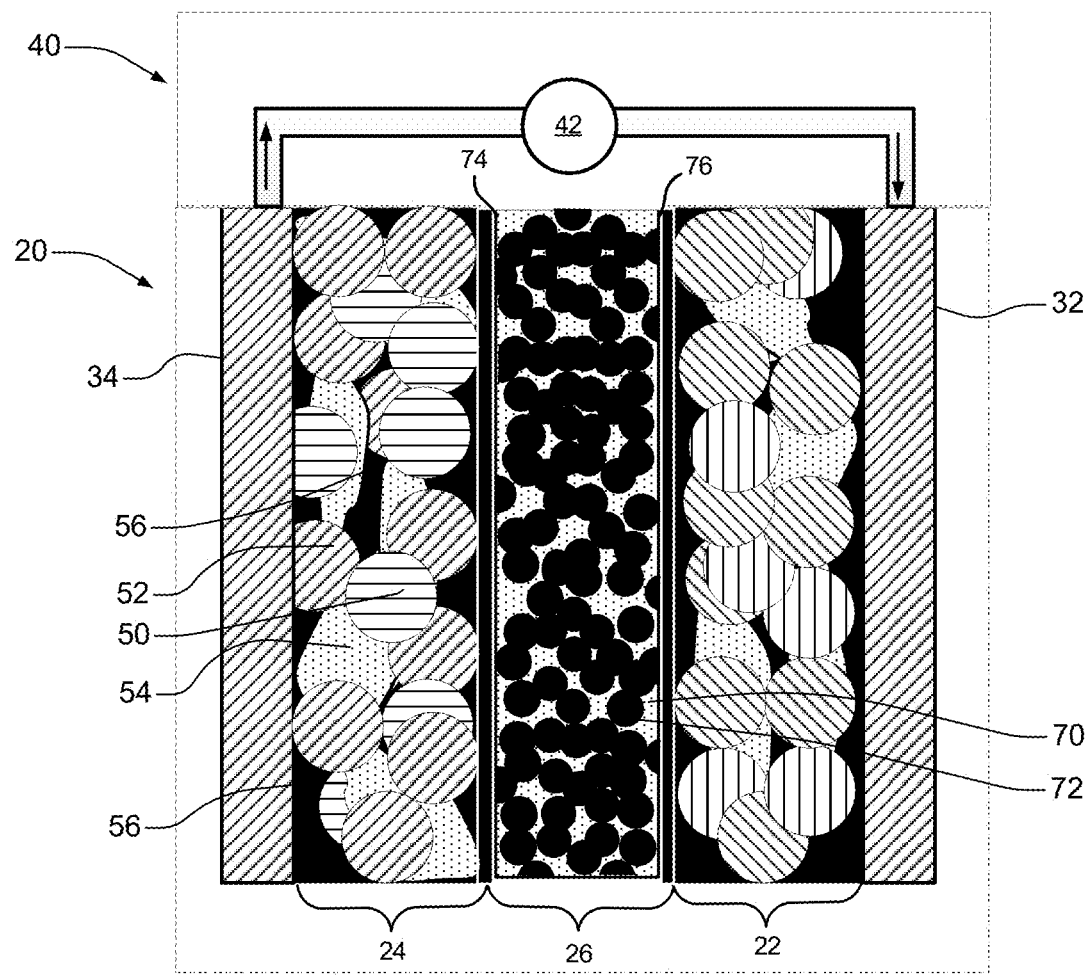
FIG. 2 is a sectional view showing additional details of the components in the electrochemical battery cell of FIG. 1.

FIG. 2 shows an example of such configurations, where the battery 20 of FIG. 1 is shown with additional detail of the negative electrode 22, positive electrode 24, and separator 26 components. The negative electrode 22 as shown is a porous composite electrode that includes a plurality of negative electroactive particles 50 and a plurality of secondary particles 52, which may include electrically conductive particles (e.g., carbon black) and/or solid-state electrolyte particles, by way of example. The plurality of negative electroactive particles 50 and plurality of secondary particles 52 are distributed in a polymeric binder matrix 54. The pores and openings defined between various particles and polymeric binder matrix 54 may be at least partially, or fully, filled with a polymer gel electrolyte 56 prepared in accordance with certain aspects of the present disclosure. In this manner, the polymer gel electrolyte 56 is shown to fill pores in the negative electrode 22.

As a result of the interparticle porosity between particles within the components in the electrochemical cell/battery 20 (for example, the battery 20 in a green form may have a solid-state electrolyte interparticle porosity greater than or equal to about 0 vol. % to less than or equal to about 30 vol. %), direct contact between the plurality of negative electroactive particles 50 and a plurality of secondary particles 52 may be much lower than the contact between a liquid electrolyte and solid-state electroactive particles in comparable non-solid-state batteries. In various aspects, such as illustrated in FIG. 2, the present disclosure may provide the polymer gel electrolyte 56 disposed in open pores. The polymer gel electrolyte 56 may be disposed within the components of the battery so as to wet interfaces and/or fill void spaces between the plurality of negative electroactive particles 50 and a plurality of secondary particles 52, which may reduce interparticle porosity and improve ionic contact and/or enable higher thermal stability, by way of non-limiting example. Alternatively, or in addition to filling pores of porous components, the polymer gel electrolyte may also be present as a coating on an electrode or separator or as a coating on individual solid particles. The battery 20 may include greater than or equal to about 0 weight % to less than or equal to about 30 weight %, and in certain aspects, greater than or equal to about 5 weight % to less than or equal to about 20 weight % of the polymer gel electrolyte.

Alternatively or in addition, the negative electrode 22 may have a surface coating 58 comprising the polymer gel electrolyte. The polymer gel electrolyte 56 disposed in pores of the negative electrode 22 and/or forming a surface coating 58 may have the same or distinct compositions.

The positive electrode 24 is shown is a porous composite electrode that includes a plurality of positive electroactive particles 60 and a plurality of secondary particles 62, which may include electrically conductive particles (e.g., carbon black) and/or solid-state electrolyte particles, by way of example. The plurality of positive electroactive particles 60 and plurality of secondary particles 62 are distributed in a polymeric binder matrix 64. The pores and openings defined between various particles and polymeric binder matrix 64 may be at least partially or fully filled with a polymer gel electrolyte 66 prepared in accordance with certain aspects of the present disclosure. In this manner, the polymer gel electrolyte 66 is shown to fill pores in the positive electrode 24.

Alternatively or in addition, the positive electrode 24 may have a surface coating 68 comprising the polymer gel electrolyte. The polymer gel electrolyte 66 disposed in pores of the positive electrode 24 and/or forming a surface coating 68 may have the same or distinct compositions.

The separator 26 is shown as a microporous polymeric layer 70 (although may be multiple layers polymeric layers, as described previously above) having pores and openings at least partially, or fully, filled with a polymer gel electrolyte 72 prepared in accordance with certain aspects of the present disclosure. In this manner, the polymer gel electrolyte 72 is shown to fill pores in the separator 26. As will be appreciated, while not shown, in other variations where the layer between the negative electrode 22 and positive electrode 24 is a solid-state electrolyte or a free-standing polymer gel membrane, the pores defined in these structures may likewise be filled with polymer gel electrolyte. Alternatively or in addition, the separator 26 may have one or more surface coatings (not shown in FIG. 2) disposed on either a first surface 74 or a second surface 76. The surface coatings may comprise the polymer gel electrolyte. The polymer gel electrolyte 72 filling pores of the separator 24 and/or forming a surface coating may have the same or distinct compositions.

As such, in accordance with certain aspects of the present disclosure the polymer gel electrolyte may be included in one or more of the following within the electrochemical cell:
a) coated on a surface of the positive electrode;
b) disposed in pores of the positive electrode as a pore filler;
c) coated on a surface of the negative electrode;
d) disposed in pores of the negative electrode as a pore filler;
e) coated on a surface of the separator;
f) disposed in pores of the separator as a pore filler; and/or
g) coated on one or more particles, for example, electroactive particles, solid-state electrolyte particles, electrically conductive particles, ceramic particles, and the like, and incorporated into various components in the battery.

For example, solid particles may be non-ion conducting ceramic filler particles on which the polymer gel electrolyte is disposed as the coating, such as silicon dioxide (SiO$_2$), aluminum oxide (Al$_2$O$_3$), titanium dioxide (TiO$_2$), magnesium oxide (MgO), zinc oxide (ZnO) and the like.

In certain aspects, the present disclosure contemplates methods of in situ gelation within a porous media, such as within open pores of a porous electrode, solid electrolyte particle layer, non-woven mat or separator, or the like. The polymer gel solid structure can be fabricated by infusing a polymer gel precursor into a layer of solid particles or pores of a substrate.

In one variation, a method of forming a polymer gel electrolyte in a component of an electrochemical cell that cycles lithium ions is provided. The method may comprise introducing a liquid precursor of the polymer gel electrolyte into (i) pores of a porous component to be incorporated into the electrochemical cell; (ii) onto solid particles to be incorporated into a component of the electrochemical cell; or both (i) and (ii). The liquid precursor comprises a polymeric blend comprising polyvinylidene fluoride-hexafluoropropylene (PVDF-HFP) and polyvinylidene fluoride (PVDF), at least one plasticizer, and at least one lithium salt, as described previously above. The precursor further comprises a volatile carrier.

The volatile carrier may be a solvent that can be removed from the precursor and may be added so as to decrease the viscosity. Notably, the volatile carrier is distinct from the plasticizer(s), in that the plasticizer(s) remain in the polymer gel electrolyte, while the volatile carrier is removed during processing. Thus, the volatile carrier may be a solvent having a relatively low-boiling point. For example, the solvent may have a boiling point less than or equal to about 150° C., and in certain aspects, optionally less than or equal to about 100° C. The optional diluent solvent may include, for example only, dimethyl carbonate (DMC), ethylene carbonate, ethyl acetate, acetonitrile, acetone, toluene, propylene carbonate, diethyl carbonate, 1,2,2-tetrafluoroethyl, 2,2,3,3-tetrafluoropropyl ether, dimethyl formamide, dimethyl sulfoxide, and combinations thereof.

The method thus includes removing the volatile carrier to form the polymer gel electrolyte disposed in at least a portion of the pores of the component or defining a coating on one or more solid particles.

Figure 3:
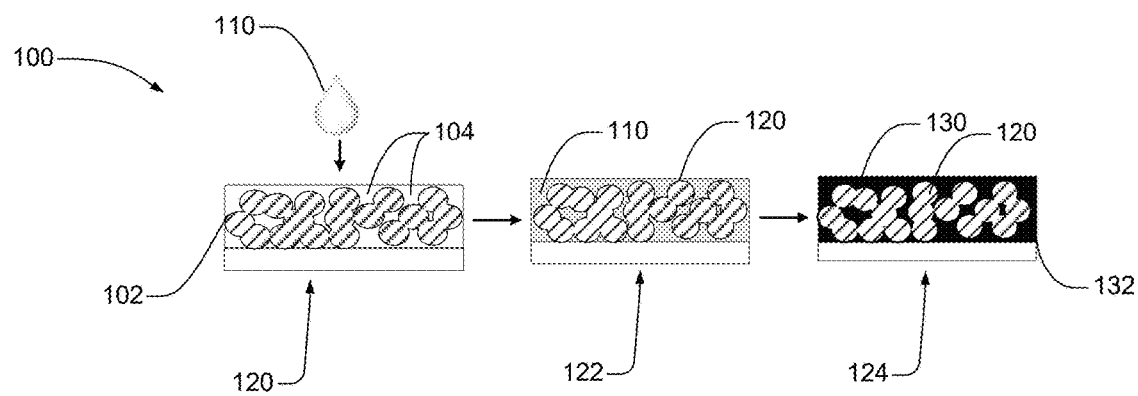
FIG. 3 shows a process for forming an electrode having a gel polymer electrolyte for an electrochemical cell that cycles lithium ions in accordance with certain aspects of the present disclosure.

In various aspects, the present disclosure provides a method shown in FIG. 3 for preparing a component for a battery having a polymer gel electrolyte like those illustrated in FIG. 2. In FIG. 3, a method 100 may generally include contacting a porous structure having open pores, such as a porous composite electrode 102 having a plurality of pores 104, with a polymer gel electrolyte precursor solution 110 shown at 120. Notably, the electrode is merely illustrative and the porous structure may be a separator or other substrate described previously above. The porous structure defines an integral structure and may include a plurality of solid particles bound in a polymeric matrix or fused together or an integral material like a porous separator or membrane. The method 100 includes contacting porous composite electrode 102 with the polymer gel electrolyte precursor solution 110 so that it imbibes or infiltrates into a portion of the open pores 104. For example, the precursor solution 110 may be added in a drop-wise, spray, or doctor-blading application method to the porous composite electrode 102, so as to impregnate the pores 104 with the precursor solution 110. For example, the precursor solution 110 may substantially fill void spaces or pores defined within a polymeric binder and between the solid-state electroactive particles and/or solid-state electrolyte particles. The precursor solution 110 includes the mixture of polymer blend of PVDF-HFP and PVDF, one or more plasticizers, one or more lithium salts, and volatile carrier, as described above, in a liquid form.

At 122, the volatile carrier is substantially removed from the precursor solution 110, which may be done at ambient conditions for a sufficient duration of time or by applying heat and/or negative pressure to accelerate the solvent removal process. After the volatile carrier is removed, at step 124, a polymer gel electrolyte 130 is formed in at least a portion of the pores 104 to define a final electrode 132. This method may be repeated for other components and then the final electrode 132 having the polymer gel electrolyte 130 may be incorporated and assembled into an electrochemical cell and/or battery. Steps 120 and 122 may occur concurrently or consecutively.

By way of non-limiting example, in certain variations, the polymer gel electrolyte precursor solution may be prepared by first mixing a polymer blend of PVDF-HFP to PVDF at a 3:1 weight ratio (5 wt. % or about 0.16 g) in a volatile carrier, for example, DMC (95 wt. % or about 3 g). After mixing the polymer blend and volatile carrier, the plasticizers and lithium salts are added and again the admixture is agitated and well mixed to form the polymer gel electrolyte precursor solution. For example, an electrolyte solution is added to the polymer blend and volatile carrier. The electrolyte solution is added at about 1.5 g, which has about 5.15 weight % of LiTFSI (0.4M), 5.15 weight % LiBF$_4$ (0.4 M) and 2.5 weight % LiBOB are combined in a mixture of plasticizers 87.2 weight %-EC and GBL at a ratio of 4:6.

Figure 4:
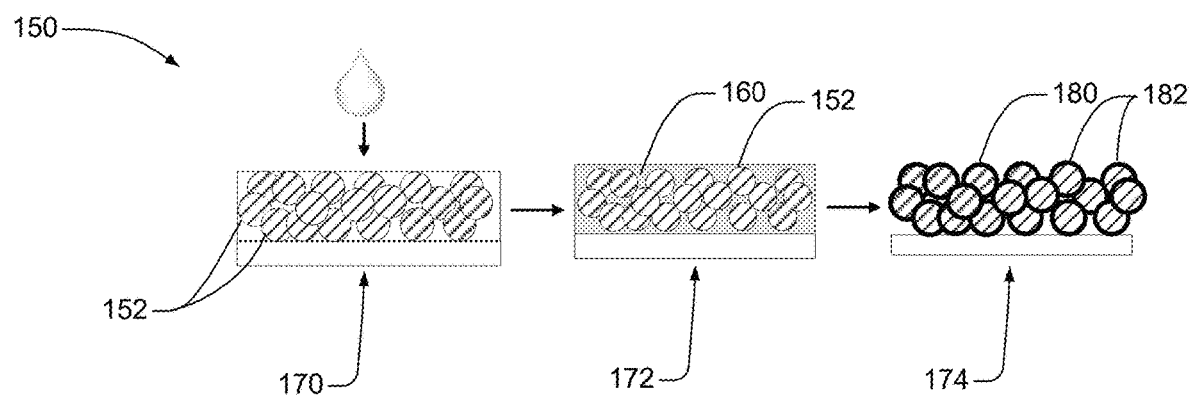
FIG. 4 shows a process for forming a gel polymer electrolyte coating on solid particles for an electrochemical cell that cycles lithium ions in accordance with certain aspects of the present disclosure.

In another variation shown in FIG. 4, a method 150 may generally include contacting a plurality of solid particles 152 with a polymer gel electrolyte precursor solution 160 shown at 170. The method 150 includes contacting exposed surfaces the solid particles 152 with the polymer gel electrolyte precursor solution 160 to facilitate forming a coating on the solid particles 152. For example, the precursor solution 160 may be added via a drop-wise, spray, doctor-blading, or bath application method, among others, to the plurality of solid particles 152, so as to contact the exposed surfaces with the precursor solution 160. The precursor solution 160 is the same as those described above, including a mixture of polymer blend of PVDF-HFP and PVDF, one or more plasticizers, one or more lithium salts, and volatile carrier, as described above, in a liquid form.

At 172, the volatile carrier is substantially removed from the precursor solution 160, which may be done at ambient conditions for a sufficient duration of time or by applying heat and/or negative pressure to accelerate the solvent removal process. After the volatile carrier is removed, at step 174, a coating 180 of polymer gel electrolyte is formed on each respective solid particle 152 to form a plurality of coated particles 182. Each coated particle 182 may then be incorporated into a component for the battery, such as into an electrode or separator. Steps 170 and 172 may occur concurrently or consecutively.

In certain other aspects, an in-situ method of forming a polymer gel electrolyte in a battery comprising a plurality of electrochemical cells that cycle lithium ions is provided. The method may comprise introducing a liquid precursor of the polymer gel electrolyte into each of the plurality of electrochemical cells. The plurality of electrochemical cells may be contained in a pouch. Each electrochemical cell may comprise a porous positive electrode comprising a positive electroactive material, a negative electrode comprising a negative electroactive material, and an electrically insulating, but ionically conductive interlayer disposed between the negative and positive electrodes, which may be a porous separator, a solid state electrolyte layer, or a free-standing gel membrane, among others. The liquid precursor comprises a polymeric blend comprising polyvinylidene fluoride-hexafluoropropylene (PVDF-HFP) and polyvinylidene fluoride (PVDF), one or more plasticizers, one or more lithium salts, and a volatile carrier. A mass ratio of PVDF-HFP to PVDF is greater than or equal to about 1.5:1 to less than or equal to about 19:1 in the polymeric blend. The plasticizer selected from the group consisting of: ethylene carbonate (EC), diethyl carbonate (DEC), vinyl ethylene carbonate (VEC), dimethyl carbonate (DMC), ethylmethyl carbonate (EMC), propylene carbonate (PC), gamma butyrolactone (GBL), diethylene glycol dimethyl ether (Diglyme), triethylene glycol dimethyl ether (Triglyme), tetraethylene glycol dimethyl ether (Tetraglyme), triethyl phosphate (TEP), 1-butyl-3-methylimidazolium-bis(trifluoromethylsulfonyl)imide (BMIM-TFSI), 1-ethyl-3-methyl-imidazolium-bis(trifluoromethylsulfonyl)imide (EMI-TFSI), alkyl pyrrolidinium bis(trifluoromethanesulfonyl) imide (PY-TFSI), piperidinium bis (trifluoromethanesulfonyl)imide (PP-TFSI), N-alkyl-N-butylpyrrolidinium bis(trifluoromethanesulfonyl)imide (PYRA-TFSI), and combinations thereof. The liquid flows into open pores within the components in the electrochemical cell, for example, open pores in the positive electrode, negative electrode, and/or porous interlayer. Then, the volatile carrier may be removed to form the polymer gel electrolyte disposed in at least a portion of the pores. Thus, a network of polymer gel electrolyte is formed within the electrochemical cells (e.g., in the pouch) in pores of the positive electrodes, negative electrodes, and/or porous interlayers. The pouch may be sealed in a conventional manner and incorporated into a battery.

Notably, batteries prepared in accordance with certain aspects of the present disclosure may be free of flowing liquid electrolytes and only contain solid-state and/or semi-solid or gel electrolytes. In this manner, the present disclosure provides several non-limiting advantages, including reducing or eliminating a risk of electrolyte leakage by using plasticized polymer gel, instead of traditional liquid flowing electrolyte, increased thermal stability over flowable liquid electrolyte, and/or improved electrochemical performance over solid electrolyte particles due to decreased contact resistance.

Certain features of the current technology are further illustrated in the following non-limiting example.

Example 1

Coin cells were prepared as follows. Each coin cell has a composite positive electrode/cathode having 44 weight % $LiMn_{0.7}Fe_{0.3}PO_4$ (LMFP—D50 of 8.9 μm, capacity of 147 mAh/g (1C), BET: 14.8 $m^2$/g), 44 weight % $LiMn_2O_4$ (LMO-D50 of 8.4 μm, capacity of 102 mAh/g (1C), BET: 0.5 $m^2$/g), 5 weight % LATP solid-state electrolyte, 3 weight % Super P™ conductive carbon black particles, and 4 weight % PVDF binder is prepared. All the components are mixed together in NMP solvent to form a slurry and the amount of solvent is adjusted to result in a solid content of about 45%, following by casting on an aluminum foil. Then the slurry was coated on the current collector surface followed by heat treatment and calendering.

The negative electrode/anode has 93 weight % graphite (D50 of 5.5 μm, 335 mAh/g (1C), BET<3.4 $m^2$/g), 1 weight % LLZO solid-state electrolyte, 2 weight % Super P™ conductive carbon black particles, and 4 weight % PVDF binder. All the components are mixed together in NMP solvent to form a slurry and the amount of solvent is adjusted to result in a solid content of about 45%. Then the slurry was coated on the current collector surfaces followed by heat treatment and calendering.

A 20 micrometer thick non-woven mat separator is disposed between the cathode and anode layers.

Next, three different polymer gel electrolyte precursor compositions are prepared. Each of the polymer gel electrolyte precursors are introduced into the pores of the calendared positive and negative electrodes and the non-woven mat separator. A comparative polymer gel electrolyte (Sample 200) having a composition of 100% PVDF-HFP is mixed at 5 wt. % with 95 wt. % liquid electrolyte is introduced into the pores of the calendared positive and negative electrodes and the separator. The liquid electrolyte has the following composition: 0.4 M LITFSI, 0.4 M $LiBF_4$ in EC/GBL=4:6 weight ratio and 2.5 wt. % or 0.18 M of LiBOB. A second polymer gel electrolyte (Sample 210) having a composition of 50% PVDF-HFP and 50 weight % PVDF is mixed at 5 wt. % with 95 wt. % liquid electrolyte is prepared, again with the liquid electrolyte having the following composition: 0.4 M LITFSI, 0.4 M $LiBF_4$ in EC/GBL=4:6 weight ratio and 2.5 wt. % or 0.18 M of LiBOB. Finally, a polymer gel electrolyte (Sample 220) prepared in accordance with certain aspects of the present disclosure has a composition of 75% PVDF-HFP and 25 weight % PVDF is mixed at 5 wt. % with 95 wt. % liquid electrolyte is prepared, again with the liquid electrolyte having the following composition: 0.4 M LITFSI, 0.4 M $LiBF_4$ in EC/GBL=4:6 weight ratio and 2.5 wt. % or 0.18 M of LiBOB. It should be noted that 100% PVDF does not promote forming a gel electrolyte.

Figure 5:
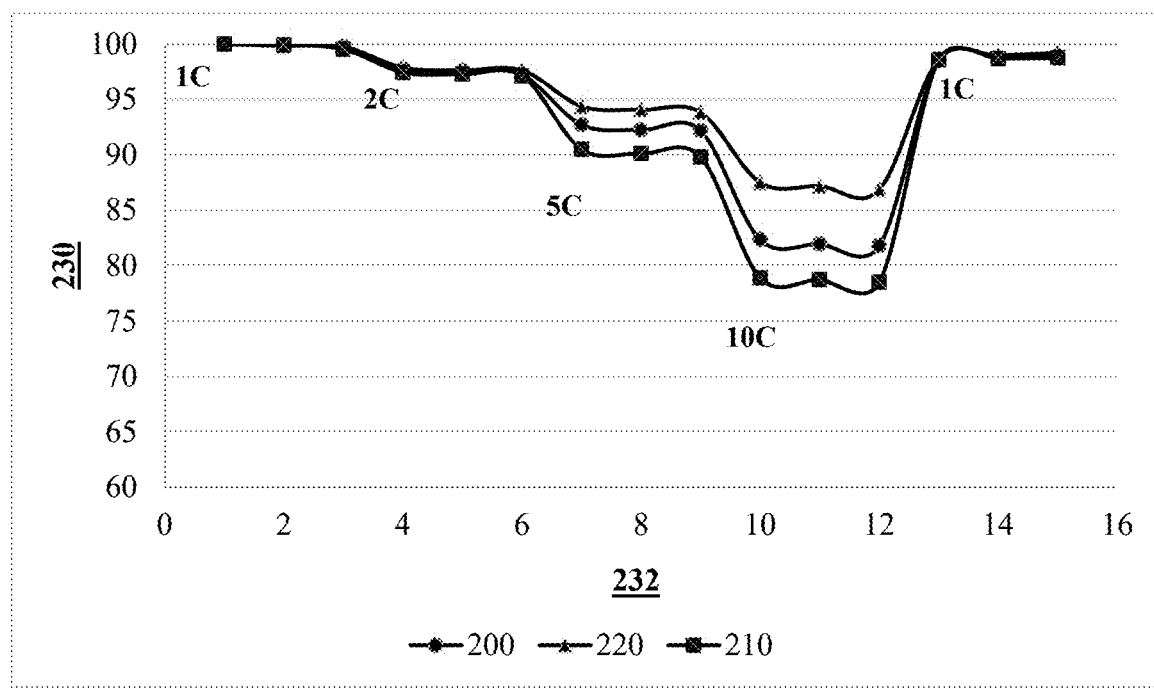
FIG. 5 shows a chart comparing discharge rate performance at different discharge rates (1 Coulombs (C), 2C, 5C, 10C) for three coin test cells while charged at 1C rate at room temperature (e.g., 25° C.). More specifically.

FIG. 5 is a plot of capacity retention (%) on the y-axis (230) versus cycle number on the x-axis (232). Discharge rate performance is measured during charging at a C-Rate of 1C and discharging at 1C, 2C, 5C, and 10C at 25° C. As can be seen, Sample 220 having a polymer blend of 75% PVDF-HFP and 25 weight % PVDF in the gel electrolyte has superior capacity retention when discharged at high rates of 5C and 10C at room temperature, as compared to 100% PVDF-HFP in Sample 200. Interestingly, Sample 210 having a polymer blend of 50% PVDF-HFP and 50 weight % PVDF performed worse than the comparative Sample 200 with 100% PVDF-HFP.

Figure 6:
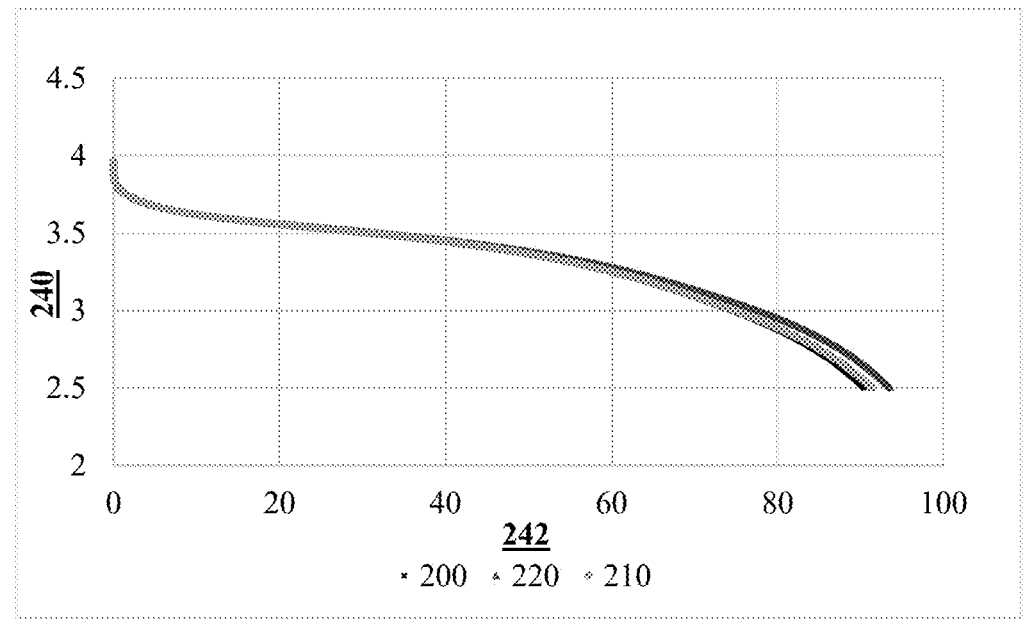
FIG. 6 shows a chart comparing cold-cranking capabilities of coin test cells having three distinct polymer gel electrolytes to show voltage (V) versus capacity retention (%) at −18° C.

FIG. 6 shows the battery coin cell tested for cold crack performance. The cold cranking performance was evaluated by charging the cells to 100% state of charge at 25° C. then discharging at 1C at −18° C. Cold cranking performance is shown as voltage (V) on the y-axis labeled 240 versus capacity retention (%) on the x-axis labeled 242. In this test, Sample 220 having a polymer blend of 75% PVDF-HFP and 25 weight % PVDF in the gel electrolyte performs better than Sample 210 having a polymer blend of 50% PVDF-HFP and 50 weight % PVDF, which performs better than 100% PVDF-HFP in Sample 200.

Figure 7:
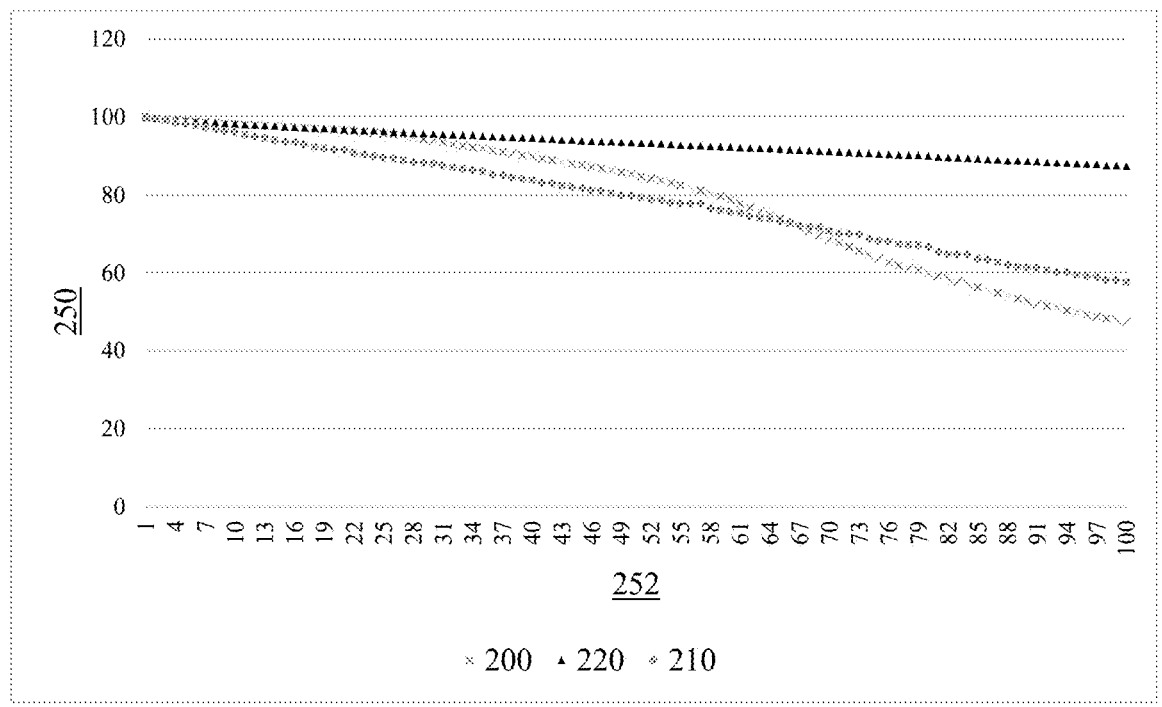
FIG. 7 shows a chart comparing high temperature performance of coin test cells having three distinct polymer gel electrolytes. More specifically.

FIG. 7 shows high temperature performance of the coin cells with the three different compositions. The testing is conducted at 45° C. with 1C cycles about 0 to 100 SOC. Capacity retention (%) on the y-axis (250) versus cycle number on the x-axis (252) are plotted. In this test, Sample 220 having a polymer blend of 75% PVDF-HFP and 25 weight % PVDF in the gel electrolyte performs better at all cycles than either of Sample 210 having a polymer blend of 50% PVDF-HFP and 50 weight % PVDF and Sample 200 with 100% PVDF-HFP. As can be seen, under certain cycles (between 20 and 60), the capacity retention of the Sample 210 with 50% PVDF-HFP and 50 weight % PVDF is worse than Sample 200 with 100% PVDF-HFP.

While not limiting to any particular theory, it is believed that certain gel electrolytes, such as those having a blend of 75% PVDF-HFP and 25 weight % PVDF (about a 3:1 mass ratio) provide unexpected and synergistic benefits for electrochemical cell performance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A polymer gel electrolyte for an electrochemical cell that cycles lithium ions, the polymer gel electrolyte comprising:
    greater than or equal to about 3 weight % to less than or equal to about 7 weight % of a polymeric blend comprising polyvinylidene fluoride-hexafluoropropylene (PVDF-HFP) and polyvinylidene fluoride (PVDF), wherein a mass ratio of PVDF-HFP to PVDF is greater than or equal to about 1.5:1 to less than or equal to about 19:1 in the polymeric blend;
    greater than or equal to about 74 weight % to less than or equal to about 84 weight % of a plasticizer, the plasticizer comprising greater than or equal to about 28 weight % to less than or equal to about 34 weight % of ethylene carbonate (EC) and greater than or equal to about 43 weight % to less than or equal to about 51 weight % of gamma butyrolactone (GBL); and
    greater than or equal to about 11 weight % to less than or equal to about 21 weight % of a lithium salt.

2. The polymer gel electrolyte of claim 1, wherein the lithium salt is selected from the group consisting of: lithium bis(trifluoromethanesulfonyl)imide (LiTFSI), lithium tetrafluoroborate (LiBF$_4$), lithium perchlorate (LiClO$_4$), lithium hexafluorophosphate (LiPF$_6$), lithium hexafluoroarsenate (LiAsF$_6$), lithium bis(fluorosulfonyl)imide (LiN(FSO$_2$)$_2$) (LiSFI), lithium bis(oxalato)borate (LiBOB), and combinations thereof.

3. The polymer gel electrolyte of claim 1, wherein the polymer gel electrolyte comprises greater than or equal to about 4 weight % to less than or equal to about 6 weight % of the polymeric blend, greater than or equal to about 74 weight % to less than or equal to about 83 weight % of the one or more plasticizers, and greater than or equal to about 12 weight % to less than or equal to about 21 weight % of the one or more lithium salts.

4. The polymer gel electrolyte of claim 1, wherein the polymer gel electrolyte further comprises:
    greater than or equal to about 2 weight % to less than or equal to about 3 weight % of vinyl ethylene carbonate (VEC).

5. The polymer gel electrolyte of claim 1, wherein the plasticizer further comprises vinyl ethylene carbonate (VEC).

6. The polymer gel electrolyte of claim 1, wherein the plasticizer comprise ethylene carbonate (EC) and gamma butyrolactone (GBL) at a mass ratio of about 1:1.5.

7. The polymer gel electrolyte of claim 1, wherein the mass ratio of PVDF-HFP to PVDF is about 3:1.

8. The polymer gel electrolyte of claim 1, wherein the lithium salt comprises lithium bis(trifluoromethanesulfonyl) imide (LiTFSI), lithium tetrafluoroborate (LiBF$_4$), and lithium bis(oxalato)borate (LiBOB).

9. An electrochemical cell that cycles lithium ions having improved capacity retention comprising:
    a positive electrode comprising a positive electroactive material;
    a negative electrode comprising a negative electroactive material;
    a porous interlayer disposed between the positive electrode and the negative electrode;
    solid-state electrolyte particles; and
    a polymer gel electrolyte that is disposed as a coating on surfaces of the solid-state electrolyte particles, the polymer gel electrolyte comprising:
        a polymeric blend comprising polyvinylidene fluoride-hexafluoropropylene (PVDF-HFP) and polyvinylidene fluoride (PVDF), wherein a mass ratio of PVDF-HFP to PVDF is greater than or equal to about 1.5:1 to less than or equal to about 19:1 in the polymeric blend;
        one or more plasticizers selected from the group consisting of: ethylene carbonate (EC), diethyl carbonate (DEC), vinyl ethylene carbonate (VEC), dimethyl carbonate (DMC), ethylmethyl carbonate (EMC), propylene carbonate (PC), gamma butyrolactone (GBL), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium-bis(trifluoromethylsulfonyl)imide (BMIM-TFSI), 1-ethyl-3-methylimidazolium-bis(trifluoromethylsulfonyl)imide (EMI-TFSI), alkyl pyrrolidinium bis(trifluoromethanesulfonyl)imide (PY-TFSI), piperidinium bis(trifluoromethanesulfonyl)imide (PP-TFSI), N-alkyl-N-butylpyrrolidinium bis(trifluoromethanesulfonyl)imide (PYRA-TFSI), and combinations thereof; and
        one or more lithium salts selected from the group consisting of: lithium bis(trifluoromethanesulfonyl)imide (LiTFSI), lithium tetrafluoroborate (LiBF$_4$), lithium perchlorate (LiClO$_4$), lithium hexafluorophosphate (LiPF$_6$), lithium hexafluoroarsenate (LiAsF$_6$), lithium bis(fluorosulfonyl)imide (LiN(FSO$_2$)$_2$) (LiSFI), lithium bis(oxalato)borate (LiBOB), and combinations thereof.

10. The electrochemical cell of claim 9, wherein the polymer gel electrolyte is further included in one or more of the following:
    a) disposed on a surface of or within pores of the positive electrode;
    b) disposed on a surface of or within pores of the negative electrode; or
    c) disposed on a surface of or within pores of the porous interlayer.

11. The electrochemical cell of claim 10, wherein the polymer gel electrolyte is further (a) disposed on a surface of or within pores of the positive electrode, the positive electrode comprising a positive electroactive material selected from the group consisting of: a rock salt layered oxide, a spinel, a polyanion cathode, a lithium-transition metal oxide, a lithium-silicon alloying compound, lithium-tin alloying compound, lithium metal, lithium alloy, lithiated metal oxide/sulfide, lithium sulfide, sulfur, and combinations thereof.

12. The electrochemical cell of claim 9, wherein the polymer gel electrolyte is further (b) disposed on a surface of or within pores of the negative electrode, the negative electrode comprising a negative electroactive material selected from the group consisting of: a carbonaceous material, a lithium-silicon alloying compound, lithium-tin alloying compound, lithium-titanate oxide, lithium metal, lithium alloy, and combinations thereof.

13. The electrochemical cell of claim 9, wherein the polymer gel electrolyte is further (c) disposed on a surface of or within pores of the porous interlayer, the porous interlayer being s one of: a non-woven mat comprising at least one of polymeric fibers and/or glass fibers, a porous polymeric membrane comprising a polyolefin, a solid state electrolyte interlayer, or a free-standing gel polymer membrane.

14. The electrochemical cell of claim 9 that further comprises ceramic particles, wherein the polymer gel electrolyte is further (d) disposed as a coating on surfaces of the ceramic particles.

15. A method of forming a polymer gel electrolyte in a component of an electrochemical cell that cycles lithium ions, the method comprising:
  introducing a liquid precursor of the polymer gel electrolyte into (i) pores of a porous component of a component to be incorporated into the electrochemical cell; (ii) onto particles to be incorporated into a component of the electrochemical cell; or both (i) and (ii); wherein the liquid precursor comprises:
    greater than or equal to about 3 weight % to less than or equal to about 7 weight % of a polymeric blend comprising polyvinylidene fluoride-hexafluoropropylene (PVDF-HFP) and polyvinylidene fluoride (PVDF), wherein a mass ratio of PVDF-HFP to PVDF is greater than or equal to about 1.5:1 to less than or equal to about 19:1 in the polymeric blend;
    greater than or equal to about 74 weight % to less than or equal to about 84 weight % of a plasticizer, the plasticizer comprising greater than or equal to about 28 weight % to less than or equal to about 34 weight % of ethylene carbonate (EC) and greater than or equal to about 43 weight % to less than or equal to about 51 weight % of gamma butyrolactone (GBL);
    greater than or equal to about 11 weight % to less than or equal to about 21 weight % of a lithium salt, and
  a volatile carrier; and
  removing the volatile carrier to form the polymer gel electrolyte disposed in at least a portion of the pores of the component or defining a coating on the particles.

16. The method of claim 15, wherein the liquid precursor is introduced into one or more of the following:
  a) disposed on a surface of a positive electrode;
  b) disposed within pores of the positive electrode;
  c) disposed on a surface of a negative electrode;
  d) disposed within pores of the negative electrode;
  e) disposed on a surface of a separator; or
  f) disposed within pores of the separator.

17. The method of claim 15, wherein the mass ratio of PVDF-HFP to PVDF is about 3:1, and wherein the lithium salt comprises lithium bis(trifluoromethanesulfonyl)imide (LiTFSI), lithium tetrafluoroborate (LiBF$_4$), and lithium bis(oxalato)borate (LiBOB).

* * * * *